(12) United States Patent
Gayrard (10) Patent No.: US 10,212,610 B2
(45) Date of Patent: Feb. 19, 2019

(54) SYSTEM FOR TELECOMMUNICATIONS BY NETWORK OF STATIONARY HIGH-ALTITUDE PLATFORMS AND DRIFTING BALLOONS

(71) Applicant: THALES, Courbevoie (FR)

(72) Inventor: Jean-Didier Gayrard, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/919,659

(22) Filed: Mar. 13, 2018

(65) Prior Publication Data
US 2018/0279133 A1 Sep. 27, 2018

(30) Foreign Application Priority Data

Mar. 23, 2017 (FR) ..................... 17 00308

(51) Int. Cl.
*H04B 10/00* (2013.01)
*H04W 16/26* (2009.01)
(Continued)

(52) U.S. Cl.
CPC ............... *H04W 16/26* (2013.01); *B64B 1/40* (2013.01); *H04B 7/026* (2013.01);
(Continued)

(58) Field of Classification Search
CPC ..... H04B 10/11; H04B 10/112; H04B 10/114; H04B 10/1123; H04B 10/1143;
(Continued)

(56) References Cited

U.S. PATENT DOCUMENTS 6,628,941 B2 * 9/2003 Knoblach .......... H04B 7/18576
455/431
8,718,477 B2 5/2014 Devaul et al.
(Continued)

FOREIGN PATENT DOCUMENTS

AU 2016 100 484 B4 10/2016

OTHER PUBLICATIONS

G. Avdikos et al., "Overview of the application of High Altitude Platform (HAP) systems in future telecommunication networks," 2008 IEEE 10th International Workshop on Signal Processing for Space Communications, Oct. 6-8, 2008, pp. 1-6, XP031365907.
(Continued)

*Primary Examiner* — Hanh Phan
(74) *Attorney, Agent, or Firm* — Baker & Hostetler LLP (57) ABSTRACT

A telecommunications system comprises: at least one station placed on a stationary high-altitude platform comprising propulsion means for remaining stationary around a specified point, the station being suitable for establishing at least one direct bidirectional communication link with another stationary high-altitude platform station; at least one network gateway station on the ground, for setting up communications between a core network and at least one station placed on a stationary high-altitude platform; a plurality of stations placed in drifting balloons for establishing a direct bidirectional communication link with at least one station placed on a stationary high-altitude platform or/and at least one other station placed in a drifting balloon; and a plurality of user terminals for establishing a direct bidirectional communication link with a station placed on a stationary high-altitude platform or/and at least one station placed in a drifting balloon.

6 Claims, 8 Drawing Sheets

(51) Int. Cl.
*H04B 7/026* (2017.01)
*H04B 10/112* (2013.01)
*H04B 7/185* (2006.01)
*B64B 1/40* (2006.01)
*H04W 48/06* (2009.01)
*H04W 84/06* (2009.01)

(52) U.S. Cl.
CPC ..... *H04B 7/18504* (2013.01); *H04B 10/1123* (2013.01); *H04W 48/06* (2013.01); *H04W 84/06* (2013.01)

(58) Field of Classification Search
CPC ............ H04B 10/1129; H04B 10/1149; H04B 10/2575; H04B 10/118; H04B 10/29; B64B 1/00; B64C 37/02; H04W 16/26; H04W 16/28; H04Q 11/0067; H04Q 11/0003; H04Q 11/0005
USPC ....... 398/118, 119, 120, 121, 122, 123, 124, 398/125, 126, 127, 128, 130, 115, 3, 5, 398/45, 48, 49; 455/12.1, 13.1, 427, 428, 455/445, 431, 420, 456.1; 244/2, 3, 30
See application file for complete search history.

(56) References Cited

U.S. PATENT DOCUMENTS 9,327,816 B1    5/2016   Mathe et al.
9,917,645 B2*   3/2018   Steinkraus ............. H04B 10/29

OTHER PUBLICATIONS

S. Temel et al., "On the performance of Flying Ad Hoc Networks utilizing near space high altitude platforms (HAPs)," 2013 IEEE 6th International Conference on Recent Advances in Space Technologies, Jun. 12, 2013, pp. 461-465, XP032477140.
G. Kandus et al., "Telecommunication Network over High Altitude Platforms," 7the International Conference on NIS, Telecommunications in Modern Satellite, Cable and Broadcasting Service, vol. 2, Sep. 28, 2005, pp. 344-347, XP010874637.

* cited by examiner

SYSTEM FOR TELECOMMUNICATIONS BY NETWORK OF STATIONARY HIGH-ALTITUDE PLATFORMS AND DRIFTING BALLOONS

CROSS-REFERENCE TO RELATED APPLICATIONS

This application claims priority to foreign French patent application No. FR 1700308, filed on Mar. 23, 2017, the disclosure of which is incorporated by reference in its entirety.

FIELD OF THE INVENTION

The field of the invention is that of telecommunications systems using communication stations placed on stationary high-altitude platforms for deploying an access network for access to a core network, for example an Internet access network, in geographical areas with low population densities and without sufficient or suitable terrestrial telecommunications infrastructures.

The invention pertains to a telecommunications system based on a network of stationary high-altitude platforms and supplemented by a set of drifting balloons to increase the size of the coverage area of the global network and to improve the quality of service for users.

BACKGROUND

The term "communication station" or "station" refers to a station comprising one or more transmitters or receivers, or a set of transmitters and receivers, including the auxiliary devices, which are required to provide a communication service in a given location.

A station placed on a high-altitude platform or HAPS, for high-altitude platform station refers to a station installed on an object placed at high altitude, for example above 18 km, and at a specified, nominal point that is fixed with respect to the Earth. A network gateway station refers to a ground station that is intended to provide a communication link with a station placed on a high-altitude platform and to control access to the core network.

Figure 1:
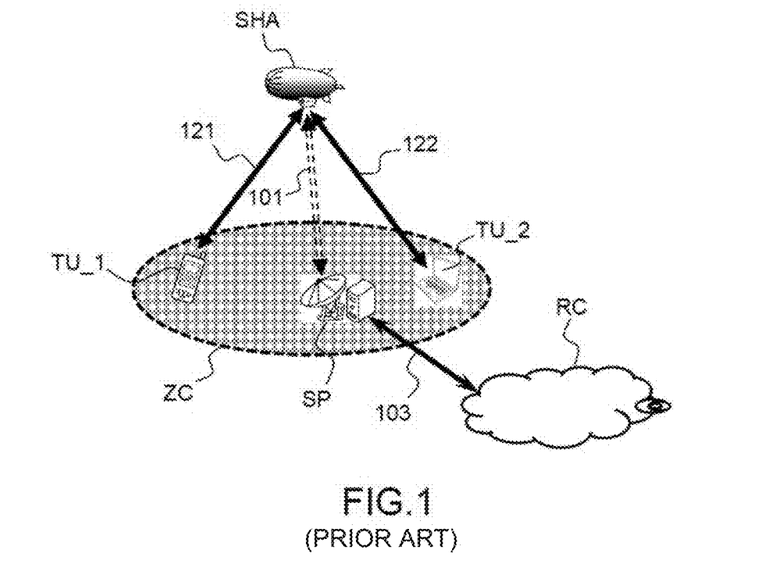
FIG. 1, a diagram of a telecommunications system based on stations placed on stationary high-altitude platforms.

FIG. 1 shows an example of a system for telecommunications via stations placed on stationary high-altitude platforms for broadband access to a terrestrial network. This system comprises a station placed on a stationary high-altitude platform SHA which communicates both with a core network RC via a network gateway station SP and with a set of user terminals TU_1, TU_2 that are dispersed throughout a coverage area ZC, to provide them with broadband access to the Internet or to other terrestrial communication networks. The stationary high-altitude platform SHA is provided with a communication payload or station comprising means for establishing bidirectional radio links 121, 122 with the mobile or fixed terminals TU_1, TU_2 and a bidirectional radio link 101 with the gateway station ST. The gateway station ST comprises means for establishing a communication link 103 for establishing access to the core network RC. The high-altitude platform is provided with propulsion means, for example propeller motors, for compensating for the strength of the winds and for remaining stationary in the sky from the point of view of the user terminals and of the gateway station. The coverage area ZC is the geographical area from which the stationary high-altitude platform is visible from the ground with a positive elevation angle, for example 5 degrees. The higher the flight altitude of the stationary high-altitude platform, the greater the radius of the coverage area. Thus, for example, a stationary high-altitude platform flying at an altitude of 20 km allows visibility with an elevation of 5 degrees in a coverage area with a radius of 194 km. The choice of flight altitude is relatively restricted by the presence of strong winds in the stratosphere. However, between the altitudes of 18 and 25 km, the stratospheric winds are gentler (typically lower than 20 m/s) and this range of altitudes is therefore chosen for positioning the stationary high-altitude platforms.

A system for telecommunications via stations placed on stationary high-altitude platforms has some drawbacks. A first drawback is the decreased size of the coverage area due to the flight altitude of the stationary high-altitude platforms being limited in practice to 20 km to take advantage of gentler winds. This limitation in the size of the coverage area decreases the number of users that are able to benefit from the access service and hence the profitability of the system.

A second drawback is the low elevation at which users on the edges of the coverage area view the stationary high-altitude platform in the sky. Thus, on the periphery of the coverage area, users are masked by hills, buildings or vegetation. There will therefore be "blind spots" in the coverage where the radio links with the terminals are blocked or attenuated by obstacles. Users fixed in blind spots or moving through blind spots will not be able to access the access service or will access it with poor quality of service.

The problem targeted by the present invention therefore consists in designing a system for telecommunications via stationary high-altitude platform stations having a coverage area that extends beyond the geographical area in which the user terminals have the high-altitude platform in their line of sight.

American patent U.S. Pat. No. 8,718,477 describes a telecommunications system based on a network of drifting balloons according to an ad-hoc mesh network principle.

Such a system has the advantage of providing a large coverage area but has the drawback of deploying a large number of balloons to provide lasting coverage, i.e. continuous coverage over time, for a given geographical area. Specifically, since a balloon is drifting by nature, it moves with the winds and its coverage area varies over time with this movement.

It is therefore desirable to provide a telecommunications system which retains some of the advantages of the systems using stationary high-altitude platforms while providing a large geographical coverage area which is more reliable and longer lasting than that provided by a network of drifting balloons.

SUMMARY OF THE INVENTION

The invention provides a telecommunications system based on one or more stations placed on one or more stationary high-altitude platforms allowing reliable and lasting geographical coverage to be provided for a given area. The invention proposes supplementing this system with a fleet of drifting balloons to extend the coverage area beyond the geographical area in which the user terminals have the high-altitude platforms in their line of sight as well as to improve the quality of service in the coverage area.

The subject of the invention is thus a telecommunications system comprising:

at least one station placed on a stationary high-altitude platform suitable for establishing at least one direct bidirectional communication link with at least one station placed on another stationary high-altitude platform;

at least one network gateway station on the ground, configured to set up communications between a core network and said at least one station placed on a stationary high-altitude platform;

a plurality of stations placed in drifting balloons, each being suitable for establishing a direct bidirectional communication link with said at least one station placed on a stationary high-altitude platform or/and at least one other station placed in a drifting balloon; and a plurality of user terminals, each being suitable for establishing a direct bidirectional communication link with a station placed on a stationary high-altitude platform or/and at least one station placed in a drifting balloon.

According to one particular aspect of the invention, a user terminal comprises a spatial diversity communication device configured to communicate simultaneously with a station placed on a stationary high-altitude platform and a station placed in a drifting balloon when the user terminal is simultaneously in range of said station placed on a stationary high-altitude platform and of said station placed in a drifting balloon.

According to one particular aspect of the invention, said at least one station placed on a stationary high-altitude platform is configured to establish a bidirectional radiofrequency communication link with said at least one network gateway station.

According to one particular aspect of the invention, said at least one station placed on a stationary high-altitude platform comprises a switch for activating at least one communication link with at least one other station placed on a stationary high-altitude platform when the communication link between said at least one station placed on the stationary high-altitude platform and said at least one network gateway station is inoperative.

According to one particular aspect of the invention, a direct bidirectional communication link between a user terminal and a station placed on a stationary high-altitude platform or/and a station placed in a drifting balloon is a radiofrequency link.

According to one particular aspect of the invention, a communication link between two stations placed in two drifting balloons or between a station placed in a drifting balloon and said at least one station placed on the stationary high-altitude platform are free-space optical links or radiofrequency links.

According to one particular aspect of the invention, said at least one direct bidirectional communication link between two stations placed on two stationary high-altitude platforms is a free-space optical link.

The stationary high-altitude platform is provided with propulsion means for remaining stationary around a specified, nominal point that is fixed with respect to the Earth.

BRIEF DESCRIPTION OF THE DRAWINGS

Other features and advantages of the present invention will become more clearly apparent upon reading the following description with reference to the appended drawings, which represent.

DETAILED DESCRIPTION

Figure 2:
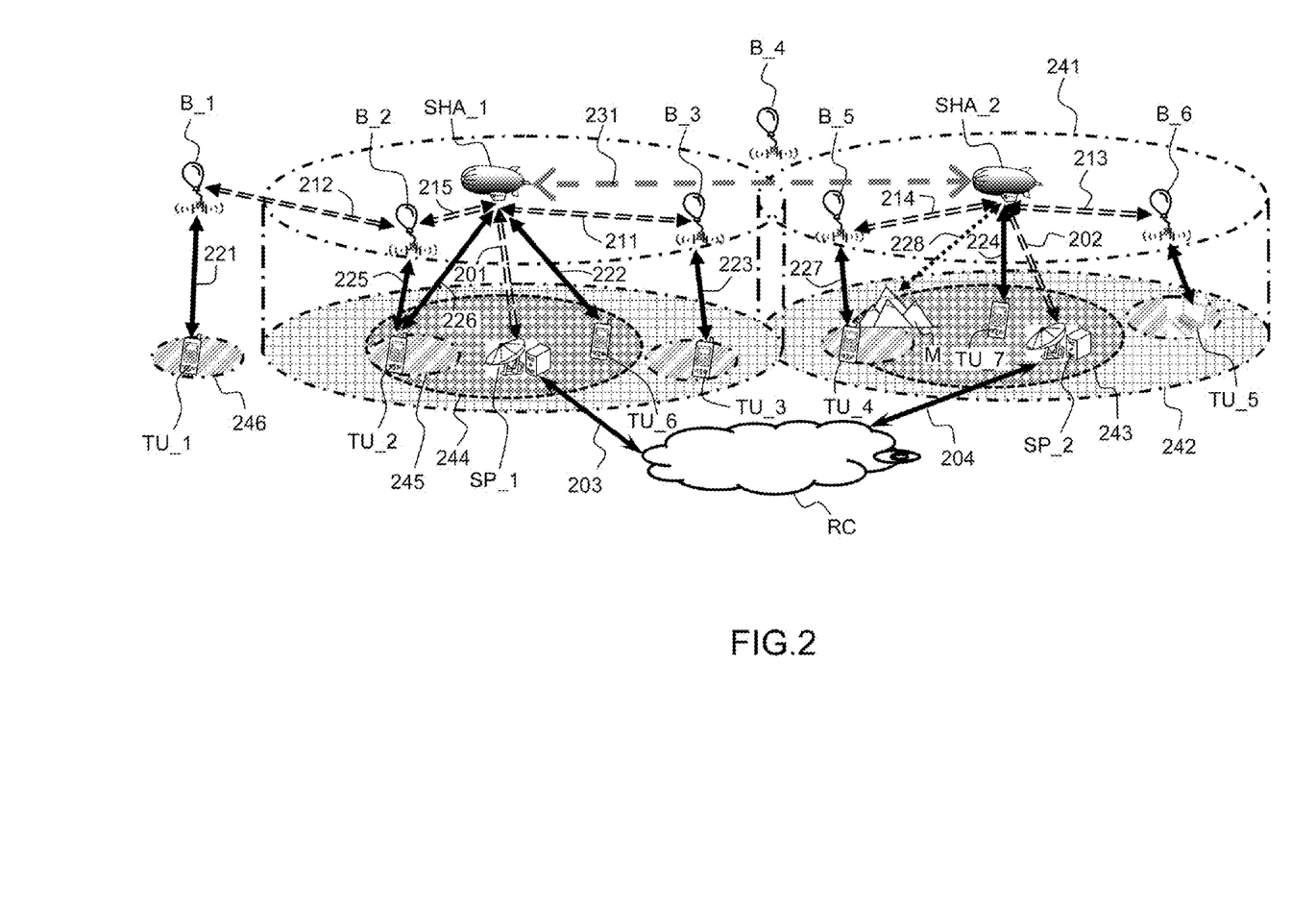
FIG. 2, a diagram of an exemplary telecommunications system according to the invention.

FIG. 2 shows an example of a telecommunications system according to one embodiment of the invention.

The system according to the invention comprises at least one stationary high-altitude platform SHA_1, SHA_2 which communicates with a core network RC via a network gateway station SP_1, SP_2 on the ground. The stationary high-altitude platform SHA_1, SHA_2 is, for example, an airship. The platform is provided with propulsion means, typically a propeller motor, allowing it to compensate for the strength of the winds so as to remain stationary around a specified, nominal point that is fixed with respect to the Earth and defines the centre of a given geographical area in which the network gateway station SP_1, SP_2 is located. The term "stationary" is understood here to mean the ability to remain fixed around a point or above an area of the Earth or to move slowly around a point, for example in a circular motion, or above a restricted geographical area. The high-altitude platform may be a stratospheric platform. It includes a payload or station which comprises means for establishing a communication link 201, 202 with the network gateway station located on the ground in the area above which the platform is stationed. The network gateway station SP_1, SP_2 is a ground station comprising both means for communicating with a station placed on a high-altitude platform, in particular a parabolic antenna and an associated transceiver, and means for interfacing with the core network. The communication link 201, 202 between a stationary high-altitude platform station SHA_1, SHA_2 and a network gateway station SP_1, SP_2 is preferably a radiofrequency link but may also be a free-space optical link or an infrared laser link. The network gateway station SP_1, SP_2 also comprises means for establishing a communication link 203, 204 with a core network RC, for example an access network for access to the Internet network. The communication link 203, 204 may be a wired link, or a link via optical fibre or via microwave transmission.

The system according to the invention may comprise multiple pairs associating a station placed on a stationary high-altitude platform with a network gateway station on the ground. Each of these pairs allows a geographical coverage area 243, 244 to be defined, in which a terminal TU_2, TU_6, TU_7 may establish a communication link 222, 224, 226 with a station placed on a stationary high-altitude platform SHA_1, SHA_2. The communications between a terminal and the core network RC pass through the network gateway stations SP_1, SP_2.

The payload or station of each stationary high-altitude platform SHA_1, SHA_2 may include a directional antenna for communicating with a network gateway station SP_1, SP_2. The fact that the platform is stationary guarantees a fixed coverage area 243, 244 in which access to the core network RC is guaranteed for those terminals located in this area.

One drawback of airship-based stationary high-altitude platforms is that they constitute expensive items of equipment, and it is therefore undesirable to use a large number thereof and hence a telecommunications system that is based solely on such items of equipment does not allow wide global geographical coverage to be provided competitively.

To supplement the system based on stationary high-altitude platforms and extend the base coverage area 243, 244, the use of a fleet of drifting balloons B_1, B_2, B_3, B_5, B_6 is proposed, said balloons being provided with communications means for establishing communications links 212 with one another as well as communications links 211, 213, 214 with a station placed on a stationary high-altitude platform. These links 211, 212, 213, 214 may be free-space optical links or radio links. The moving balloons B_1, B_2, B_3, B_5, B_6 also comprise communications means for establishing communications links 221, 223, 225, 227 with terminals on the ground TU_1, TU_2, TU_3, TU_4, TU_5. The links 221, 222, 223, 224, 225, 226, 227, 228 may be radiofrequency links according to the 4G/LTE mobile communication standard or any other radiofrequency telecommunication standard.

A terminal TU_1 located in an area outside of the coverage area 244 of a high-altitude platform SHA_1 may access the core network RC via a drifting balloon B_1 if this terminal TU_1 is in direct range of a drifting balloon B_1. If this is the case, the communications are relayed via one or more drifting balloons B_1, B_2 up to the closest high-altitude platform SHA_1, which in turn relays the communications to a network gateway station SP_1. In particular, if the balloon B_1 is not in direct range of a high-altitude platform SHA_1, it may establish a link with the closest platform SHA_1 via another drifting balloon B_2 that is in range.

Figure 3:
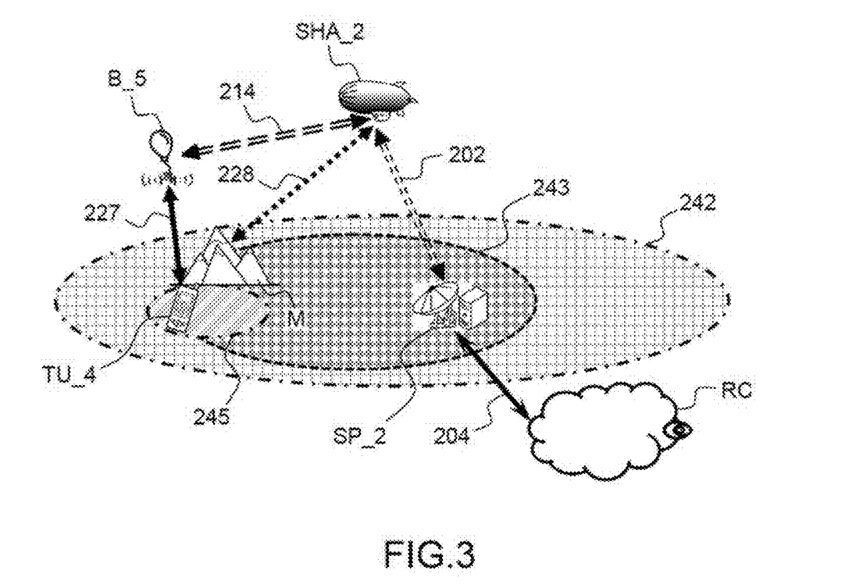
FIG. 3, a diagram of a portion of a telecommunications system according to the invention in a first configuration for a particular application.

Another scenario, described in FIG. 3, relates to a terminal TU_4 which is in range of a station placed on a high-altitude platform SHA_2 but in which the link between said terminal and this station is occulted or heavily attenuated by an obstacle M such as a geographical obstacle, for example a building or a hill. In this case, the communication between the terminal TU_4 and the station placed on a high-altitude platform SHA_2 may also pass via a drifting balloon B_5 which acts as a relay since the terminal TU_4 is in the coverage area 245 of the balloon B_5.

The geographical coverage area 245, 246 of a drifting balloon B_1, B_2 is substantially smaller than that of a high altitude platform SHA_1, in particular because it is not possible for it to hold a complex antenna (typically an active antenna) that is capable of generating a set of steerable transmission/reception beams to compensate for the motion and the drift of the drifting balloon, since said balloon is, by nature, mobile, moves with the winds and can rotate about itself. Typically, the coverage area 245, 246 of a drifting balloon provided with a simple antenna (typically a passive antenna with a single transmission/reception beam) has a diameter of about 30 km corresponding to a flight altitude of the drifting balloon of 20 km and an elevation of 30 degrees. Therefore, the use of drifting balloons alone does not allow a lasting, continuous, large and stable coverage area to be provided due to the mobility of the balloons.

Thus, it is advantageous to combine the network of stationary high-altitude platforms with a fleet of drifting balloons to form a stable base coverage area and to increase this base coverage area by virtue of the drifting balloons.

Figure 4:
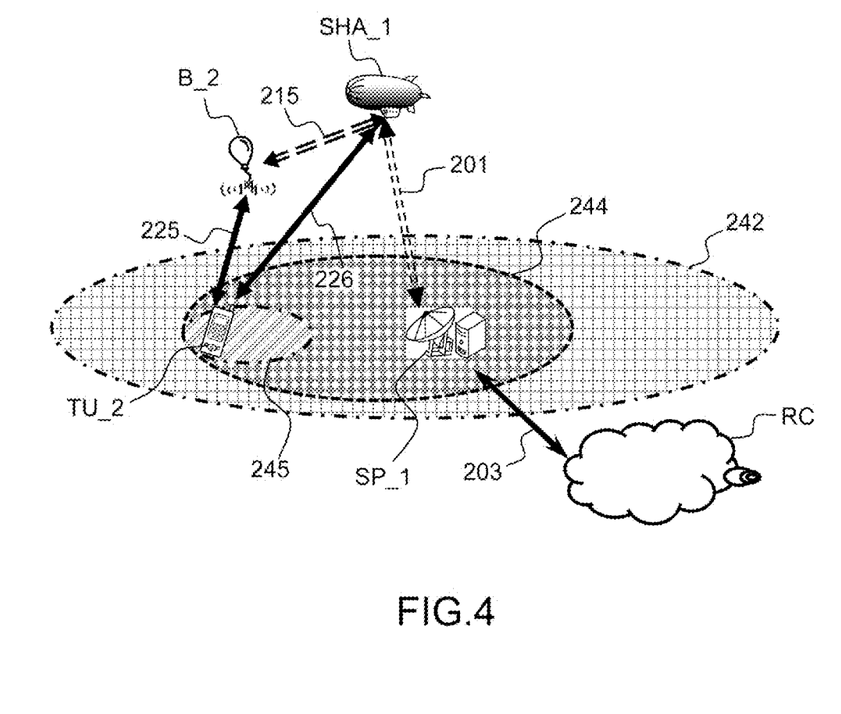
FIG. 4, a diagram of a portion of a telecommunications system according to the invention in a second configuration for a particular application.

According to one particular embodiment of the invention illustrated in FIG. 4, one or more terminals TU_2 may be provided with a spatial diversity communication device to communicate simultaneously with a drifting balloon B_2 and a high-altitude platform SHA_1. Such a communication device may, for example, take the form of a MIMO (multiple-input multiple-output) transceiver including two antennas for transmitting and receiving signals both to and from a station placed in a drifting balloon and a high-altitude platform station. The signals received over the two antennas are combined to improve the link budget by making use of the spatial diversity between a link 225 (terminal, drifting balloon) and a link 226 (terminal, high-altitude platform). Thus, the resulting signal-to-noise ratio and hence the quality of service are improved for the terminal TU_2. The implementation of a MIMO technique within a receiver TU_2 requires the transmitters on board the high-altitude platform SHA_1 and the drifting balloon B_2 to be synchronized by means of the link 215.

A terminal TU_2 may activate a spatial diversity communication device when it is in the coverage area 244 of a high-altitude platform SHA_1 and in the coverage area 245 of a drifting balloon B_2. Alternatively, the spatial diversity communication device may also select the link having the best signal-to-noise ratio, out of the two available communication links 225, 226, depending on the relative movements of the terminal, of the drifting balloon and of the high-altitude platform.

Figure 5:
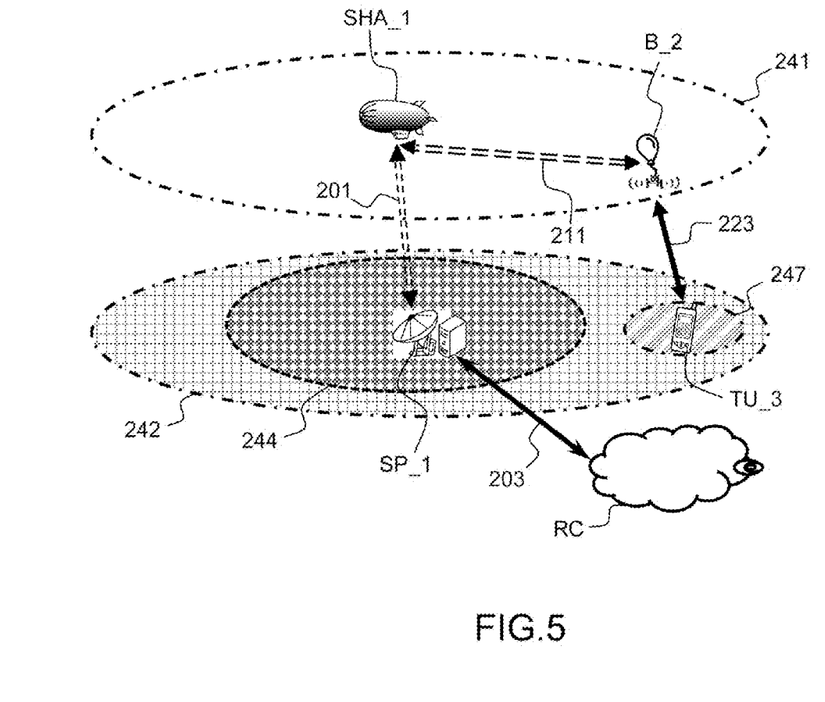
FIG. 5, a diagram of a portion of a telecommunications system according to the invention in a third configuration for a particular application.

FIG. 5 illustrates a case of use of the invention allowing the coverage area 242 of the telecommunications system to be extended beyond the coverage area 244 of the stationary high-altitude platform SHA_1. The terminal TU_3 is not located in the base coverage area 244 of the stationary high-altitude platform SHA_1, but is located in the coverage area 247 of the balloon B_2 and may therefore establish a link 223 with the station placed in the drifting balloon B_2. The balloon B_2 is in the area of visibility 241 of the stationary high-altitude platform SHA_1 and may establish a bidirectional link 211 with the stationary high-altitude platform station SHA_1 to relay the link 223 to the stationary high-altitude platform station SHA_1. The terminal TU_3 obtains an access service for accessing the core network RC through the links 223, 211, 201 and 203.

Figure 6:
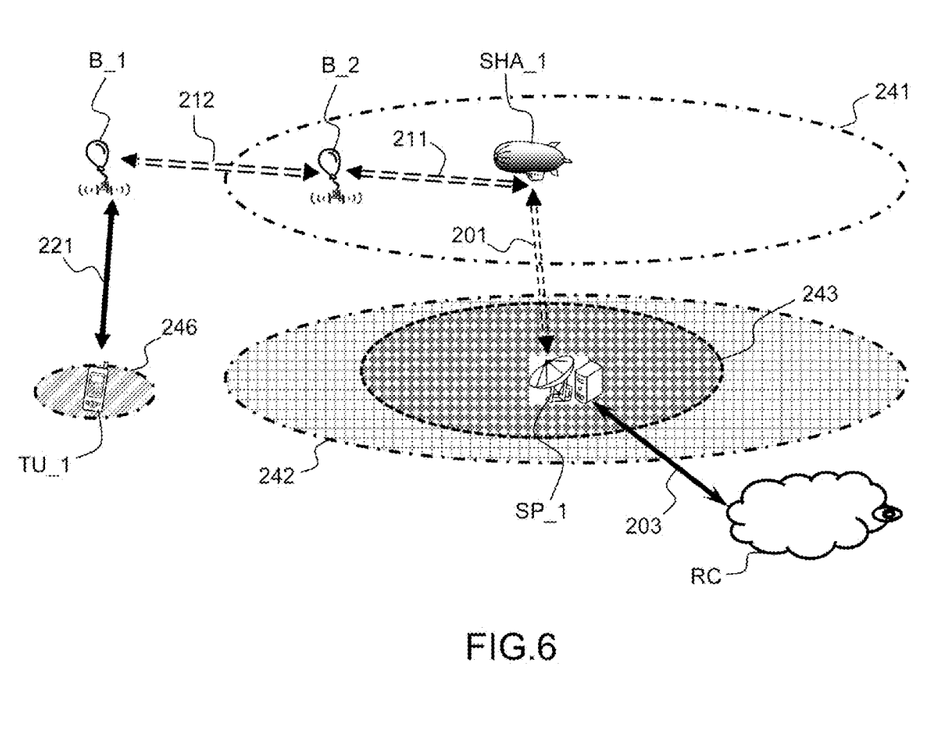
FIG. 6, a diagram of a portion of a telecommunications system according to the invention in a fourth configuration for a particular application.

FIG. 6 illustrates a case of use of the invention to provide an access service to a terminal TU_1 located outside the extended coverage area 242 of the telecommunications system. The terminal TU_1 is in the coverage area 246 of a balloon B_1 and establishes a link 221 with said balloon. The balloon B_1 is not in the area of visibility 241 of the stationary high-altitude platform SHA_1 but it is in sight of a second balloon B_2 which is included in the area of visibility 241 of the platform SHA_1. The balloon B_1 establishes a link 212 with the balloon B_2, and the balloon B_2 establishes a link 211 with the platform SHA_1. The terminal TU_1 obtains an access service for accessing the core network RC through the links 221, 212, 211, 201 and 203.

Figure 7:
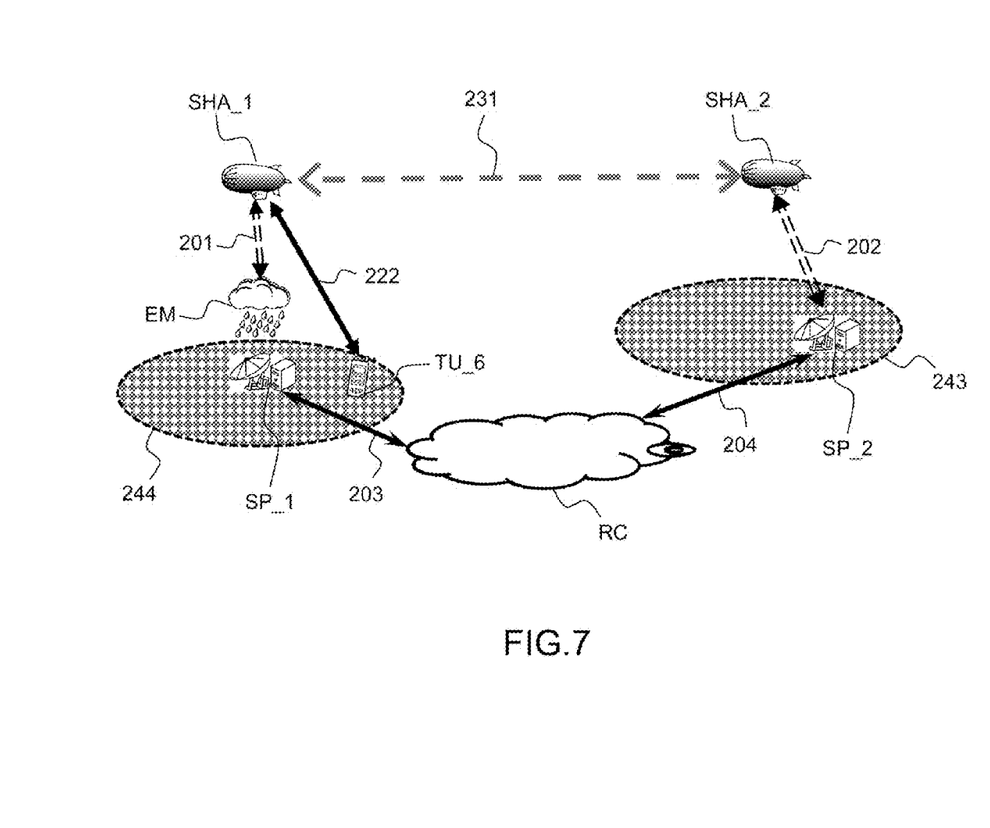
FIG. 7, a diagram of a portion of a telecommunications system according to the invention in a fifth configuration for a particular application.

According to another embodiment of the invention, illustrated in FIG. 7, each stationary high-altitude platform station SHA_1 may be provided with a communication device for establishing a communication link 231 with another stationary high-altitude platform station SHA_2. The link 231 between two high-altitude platform stations may be formed by a free-space optical link or infrared laser link. The link 231 may be used in the event of failure of a communication link 201 between a station placed on a stationary high-altitude platform SHA_1 and a network gateway station SP_1. For example, if the link 201 between the high-altitude platform station SHA_1 and the network gateway station SP_1 is broken or inoperative because of a meteorological event EV (clouds or stormy weather) which affects the transmissions between these two items of equipment, a backup link 231 between the high-altitude platform station SHA_1 and another high-altitude platform station SHA_2 may be used to access the core network RC via another network gateway station SP_2. A backup link 231 exhibits greater availability since it is an air-air link between two high-altitude platforms that are stationed, for example, in the stratosphere or, more generally, in an atmosphere zone located above the clouds and bad weather (rain, snow, hail, etc.). Conversely, a link between a station placed on a high-altitude platform and a network gateway station located on the ground is more sensitive to the phenomena of attenuation and distortion of the radio signals due in particular to bad weather (rain, snow, hail, etc.).

Figure 8:
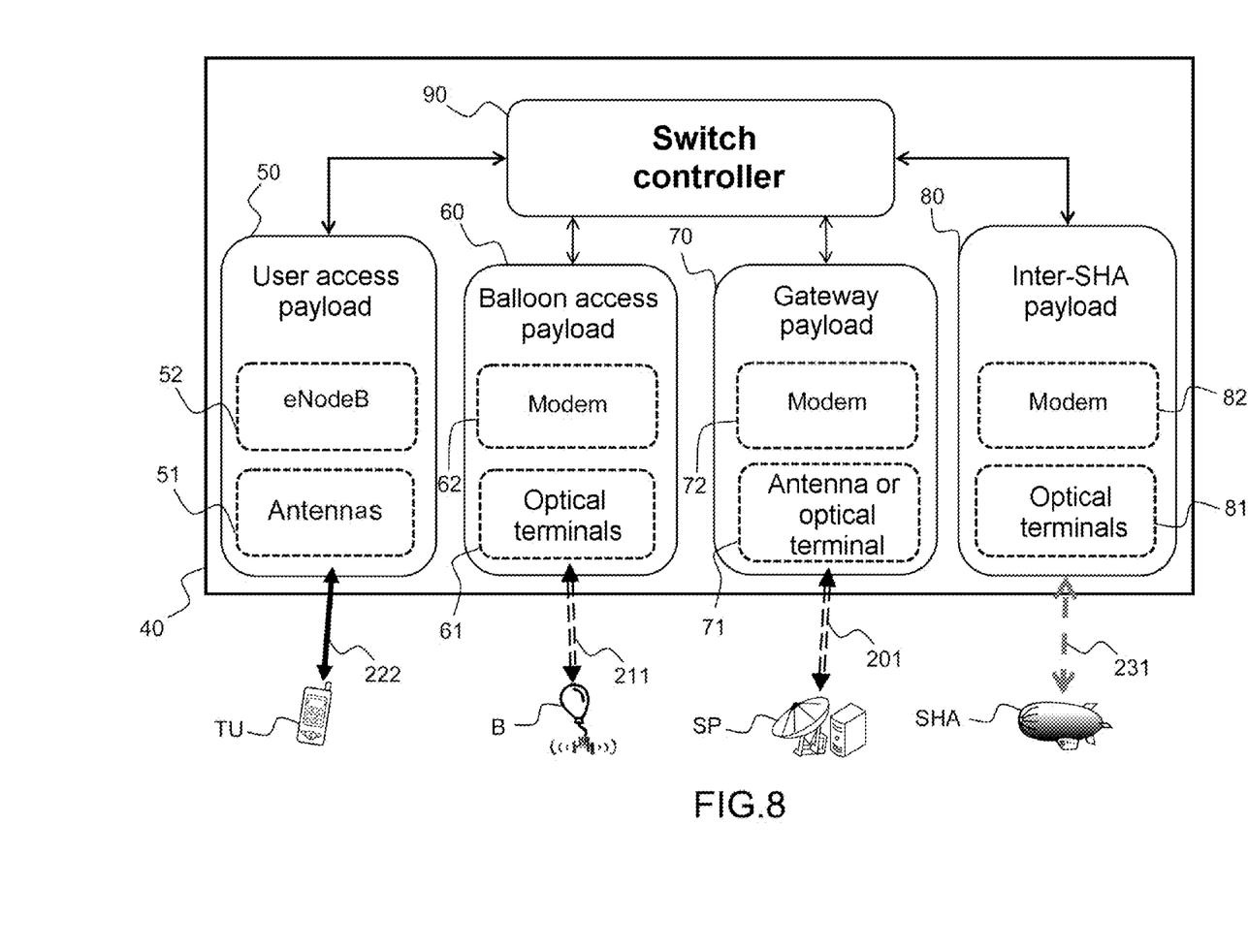
FIG. 8, a diagram of an exemplary payload or station placed on a stationary high-altitude platform belonging to a system according to the invention.

FIG. 8 schematically shows an exemplary payload of a stationary high-altitude platform SHA_1, SHA_2 according to one embodiment of the invention. The payload 40 comprises a user access payload 50 which comprises a telecommunication device for establishing one or more bidirectional links 222 with user terminals TU, a balloon access payload 60 which comprises a telecommunication device for establishing one or more bidirectional links 211 with at least one free drifting balloon BL, a gateway access payload 70 which comprises a telecommunication device for establishing one or more bidirectional links 201 with at least one network gateway station SP, an inter-platform payload 80 which comprises a telecommunication device for establishing one or more bidirectional links 231 with at least one stationary high-altitude platform SHA and a switching and control unit 90.

The user access payload 50 comprises a set of active antennas 51 that are capable of generating a set of steerable beams and of receiving and transmitting radiofrequency signals in the direction of the users TU, a set of modulator-demodulators (eNodeB for example) 52 that are capable of demodulating and of modulating the radio signals according to the 4G/LTE mobile communication standard, for example, or any other radiofrequency telecommunication standard. The user access payload 50 is connected to the switching and control unit 90 so as to exchange the information received and intended for the user terminals TU and any other information capable of ensuring the correct operation of the user access payload 50, for example information for pointing the antennas 51 or for the operational configuration of the modems 52.

The set of active antennas 51 comprises the aerials of the antenna (the visible portions of an antenna system that are without electronics), the transmission power amplifiers and the low-noise reception preamplifiers. Optionally, the set of active antennas 51 comprises analogue-to-digital and digital-to-analogue conversion means for interfacing with the set of modulator-demodulators 52 in digital format. Optionally, the set of active antennas 51 comprises digital beamformers that are capable of generating and of pointing a plurality of antenna beams in the direction of the user terminals.

The balloon access payload 60 comprises a set of optical terminals or antennas 61 that are capable of establishing a bidirectional optical or radiofrequency link 211 with drifting balloons B, and a set of modulator-demodulators 62. The balloon access payload 60 is connected to the switching and control unit 90 so as to exchange the information received and intended for the balloons B and any other information capable of ensuring the correct operation of the balloon access payload 60. The optical communication links are free-space optical links and may be implemented by means of infrared lasers.

The gateway access payload 70 comprises a set of optical terminals or antennas 71 that are capable of establishing a bidirectional optical or radio link 201 with at least one network gateway station SP, and a set of modulator-demodulators 72. The gateway access payload 70 is connected to the switching and control unit 90 so as to exchange the information received and intended for the network gateway stations and any other information capable of ensuring the correct operation of the gateway access payload.

The inter-platform payload 80 (inter-SHA) comprises at least one optical terminal 81 that is capable of establishing a bidirectional optical link 231 with another stationary high-altitude platform station SHA, and at least one modulator-demodulator 82. The inter-SHA payload 80 is connected to the switching and control unit 90 so as to exchange the information received and intended for the other stationary high-altitude platform station SHA and any other information capable of ensuring the correct operation of the inter-SHA payload.

The switching and control unit 90 routes the information and the data between the four payloads, and commands and controls the four payloads and the interface with the avionics system of the high-altitude stationary platform.

Figure 9:
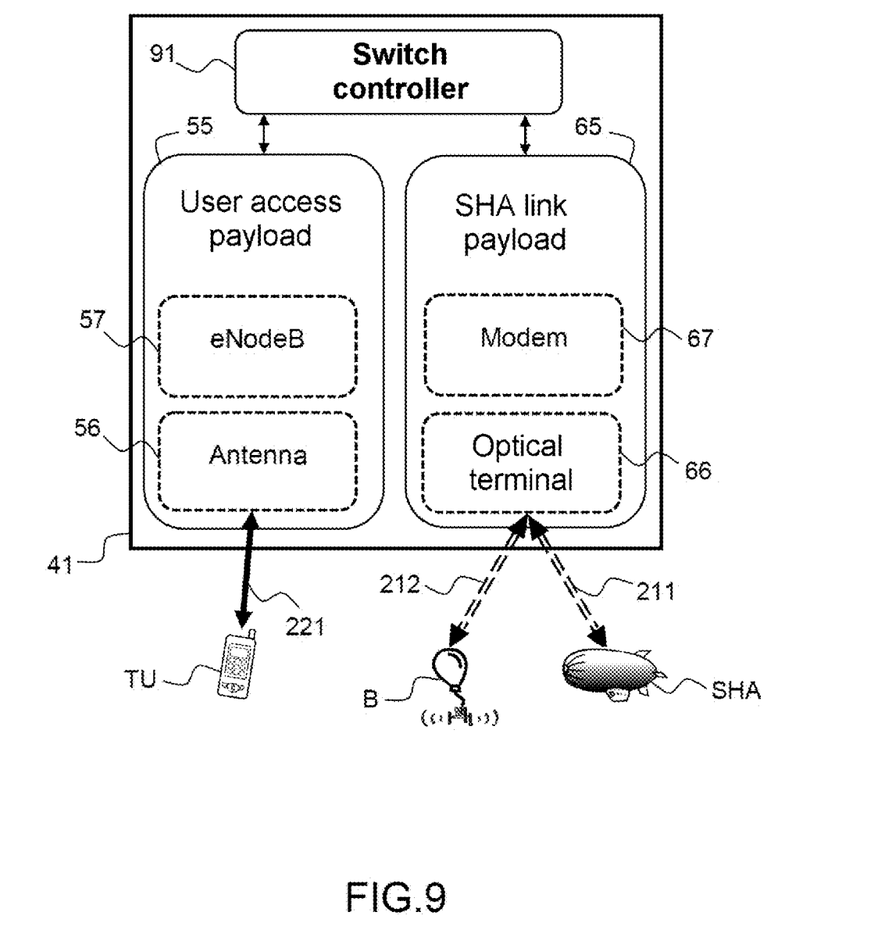
FIG. 9, a diagram of an exemplary payload or station placed in a drifting balloon which supplements the telecommunications system according to the invention.

FIG. 9 shows an exemplary payload or station 41 of a free drifting balloon BL according to one embodiment of the invention. The payload 41 comprises a user access payload 55 which comprises a telecommunication device for establishing one or more bidirectional links 221 with user terminals TU, a platform link payload 65 which comprises a telecommunication device for establishing a bidirectional link 211 with at least one high-altitude stationary platform SHA and a switching and control unit 91.

The user access payload 55 comprises at least one antenna 56 that is capable of receiving and transmitting radio signals in the direction of the users TU and at least one modulator-demodulator (eNodeB for example) 57 capable of demodulating and of modulating the radio signals according to the 4G/LTE mobile communication standard, for example, or any other radiofrequency telecommunication standard. The user access payload 55 is connected to the switching and control unit 91 so as to exchange the information received and intended for the user terminals.

The platform link payload 65 comprises an optical terminal or a steerable antenna 66 that is capable of establishing a bidirectional optical or radiofrequency link 211 with a stationary high-altitude platform station SHA and a modulator-demodulator 62. The platform link payload 65 is connected to the switching and control unit 91 so as to exchange the information received and intended for a stationary high-altitude platform station SHA and any other information capable of ensuring the correct operation of the platform link payload 65. The optical communication links are free-space optical links and may be implemented by means of infrared lasers.

Optionally, the payload 41 comprises a balloon access payload which comprises telecommunication means for establishing a bidirectional link 212 with another balloon B.

The invention claimed is:

1. A telecommunications system comprising:
   at least one station placed on a stationary high-altitude platform comprising propulsion means for remaining stationary around a specified point, said station being suitable for establishing at least one direct bidirectional communication link with at least one station placed on another stationary high-altitude platform;
   at least one network gateway station on the ground, configured to set up communications between a core network and said at least one station placed on a stationary high-altitude platform;
   a plurality of stations placed in drifting balloons, each being suitable for establishing a direct bidirectional communication link with said at least one station placed on a stationary high-altitude platform or/and at least one other station placed in a drifting balloon; and
   a plurality of user terminals, each being suitable for establishing a direct bidirectional communication link with a station placed on a stationary high-altitude platform or/and at least one station placed in a drifting balloon,
   wherein said at least one station placed on a stationary high-altitude platform comprises a switch for activating at least one communication link with at least one other station placed on a stationary high-altitude platform when the communication link between said at least one station placed on the stationary high-altitude platform and said at least one network gateway station is inoperative.

2. The telecommunications system according to claim 1, wherein a user terminal comprises a spatial diversity communication device configured to communicate simultaneously with a station placed on a stationary high-altitude platform and a station placed in a drifting balloon when the user terminal is simultaneously in range of said station placed on a stationary high-altitude platform and of said station placed in a drifting balloon.

3. The telecommunications system according to claim 1, wherein said at least one station placed on a stationary high-altitude platform is configured to establish a bidirectional radiofrequency communication link with said at least one network gateway station.

4. The telecommunications system according to claim 1, wherein a direct bidirectional communication link between a user terminal and a station placed on a stationary high-altitude platform or/and a station placed in a drifting balloon is a radiofrequency link.

5. The telecommunications system according to claim 1, wherein a communication link between two stations placed in two drifting balloons or between a station placed in a drifting balloon and said at least one station placed on the stationary high-altitude platform are free-space optical links or radiofrequency links.

6. The telecommunications system according to claim 1, wherein said at least one direct bidirectional communication link between two stations placed on two stationary high-altitude platforms is a free-space optical link.

* * * * *